A. DE CAPITANI.
MACHINE FOR THE MANUFACTURE OF TAPES CONTAINING PARALLEL ELECTRIC WIRES.
APPLICATION FILED MAY 8, 1915.
1,243,142.
Patented Oct. 16, 1917.
2 SHEETS—SHEET 2.
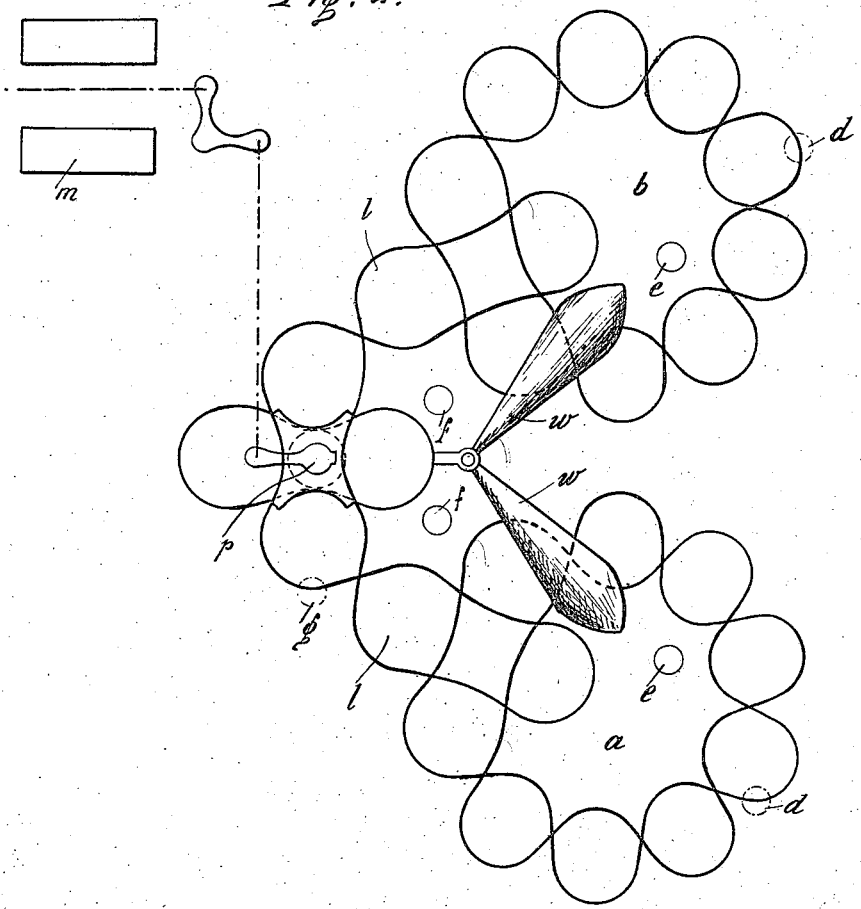
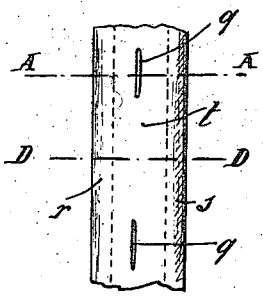
Inventor;
Antonio De Capitani,
By Knight Bros
attys.

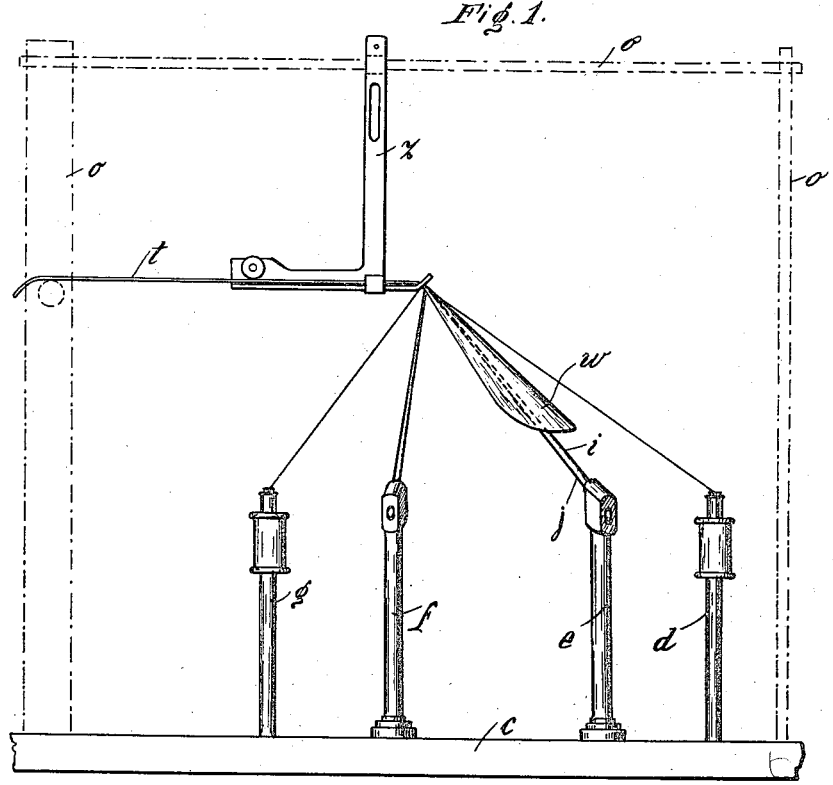

UNITED STATES PATENT OFFICE.

ANTONIO DE CAPITANI, OF MILAN, ITALY.

MACHINE FOR THE MANUFACTURE OF TAPES CONTAINING PARALLEL ELECTRIC WIRES.

1,243,142.   Specification of Letters Patent.   Patented Oct. 16, 1917.

Application filed May 8, 1915. Serial No. 26,786.

*To all whom it may concern:*

Be it known that I, ANTONIO DE CAPITANI, a subject of the King of Italy, resident of Milan, in the Kingdom of Italy, No. 17 Via Benvenuto Cellini, have invented new and useful Improvement in Machines for the Manufacture of Tapes Containing Parallel Electric Wires, of which the following is a specification.

The present invention relates to new and useful improvements in a machine for the manufacture of tapes containing parallel electric wires connected with each other by a tape in which spaced apertures are formed for engagement with insulators. This tape is particularly suitable for provisional, and even for permanent electric lighting plants and enables a ready and quick installation and dismounting.

The annexed drawing shows schematically, the design of a machine for manufacturing a tape covering two wires and connecting the same together by a connecting tape.

Figure 1 is a side elevation of a machine constructed in accordance with my invention;

Fig. 2 a plan view thereof;

Fig. 3 is a detail view of the completed tape;

Figs. 4 and 5 are cross sections taken through the lines A—A and D—D in Fig. 3.

My improved machine consists essentially of the elements which make up the conventional braiding machine for covering electric wires, which machine is fitted with two sets of bobbin-carrying spindles which move along separate inclosed tortuous paths, closed.

—a— and —b— Fig. 2 are the respective race-paths of the two spindle sets. The race-path of each spindle set consists of two undulating curves interwoven with one another and closed upon themselves. —d—d— represent two of the bobbin-carrying spindles, which are moved each on one of the two curves in each system in opposition to the motion of the spindles moving along the other curve of the same system, the spindles being actuated in the well known manner by gears driven from shafting arranged beneath the table —c— in the ordinary way (not shown on the drawing).

By the interlacing of the threads which are unwinding from the bobbins turning on the spindles and running along the said paths, each of the two spindle sets forms a tubular covering for one of the two wires to be covered. The metallic wire is fed through the small hollow posts —e— and forwarded inside of a hollow cone —w— on whose outer surface takes place the braiding of the threads supplied by the bobbins of the spindle sets —a— and —b— so forming a braided tubular covering on each wire.

To interweave a connecting tape for the two braided coverings a third set of bobbin-carrying spindles —g— is provided, the race-path —l—l— of which connects the race-paths —a— and —b— with one another. Accordingly this third spindle set, by interlacing its threads with the threads forming the braided tubular covering of each wire, forms a flat tape connecting the two wires together.

For forming apertures in the tape at predetermined distances, a jacquard arrangement of any suitable form and schematically shown as at —m— is used. The jacquard is actuated in a preëstablished ratio to the motion of the spindle sets and by means of a pulling cord —n— alternately opens and closes, at preëstablished time intervals, a switching device —p—. By the action of this switch the two paths —l—l— are alternately united into a single path, which all the spindles —g— are obliged to run along, or are kept apart so as to form two separate paths each of which is run over by a half of the total number of spindles —g—. In the former case a single tape is obtained, in the latter two tapes are formed which are separated by the discontinuities or apertures —q— left in the middle. —o— schematically shows the machine frame, and —z— is an arrangement for supporting and guiding the tape obtained.

The Figs. 3–4 and 5 show the tape with the wires connected by the same, —i— and —j— are the two wires, —r— and —s— their coverings, —t— the connecting tape, and —q— the apertures formed in the tape.

In addition to the posts —e— further posts —f— and —g— could be provided for the case of tapes fitted with more than two wires.

Having now described my invention and how the same is to be carried out, what I claim as my invention, is:

1. A machine for manufacturing a tape containing a plurality of parallel electric wires and having therein eyelets at predetermined intervals, comprising a set of bobbin-carrying spindles for each of the said electric wires for forming tubular coverings therearound, a plurality of continuous paths for each set of spindles, another set of spindles operating in conjunction with the aforesaid sets of spindles, a plurality of paths for said other set of spindles, switching devices for the plurality of paths of said other set of spindles and means for operating said switching devices at predetermined intervals, said plurality of paths for said other spindles being constructed in a manner to form alternately a single tape and a pair of tapes interengaging with said tubular coverings.

2. A machine for manufacturing a tape containing a plurality of parallel electric wires and having therein eyelets at predetermined intervals, comprising a set of bobbin-carrying spindles for each of the said electric wires for forming tubular coverings therearound, a plurality of continuous paths for each set of spindles, another set of spindles operating in conjunction with the aforesaid sets of spindles, a plurality of paths for said other set of spindles, switching devices for the plurality of paths of said other set of spindles, means for operating said switching devices at predetermined intervals, said plurality of paths for said other spindles being constructed in a manner to form alternately a single tape and a pair of tapes interengaging with said tubular coverings and cones along the axis of which, the wires to be covered are adapted to pass, and on the outer surface of which, are adapted to be guided, the threads for forming the coverings of said wires.

3. A machine for manufacturing a tape containing a plurality of parallel electric wires and having therein eyelets at predetermined intervals, comprising a set of bobbin-carrying spindles for each of the said electric wires for forming tubular coverings therearound, a plurality of continuous paths for each set of spindles, another set of spindles operating in conjunction with the aforesaid sets of spindles, a plurality of paths for said other set of spindles, switching devices for the plurality of paths of said other set of spindles, means for operating said switching devices at predetermined intervals, said plurality of paths for said other spindles being constructed in a manner to form alternately a single tape and a pair of tapes interengaging with said tubular coverings and a jacquard arrangement to actuate said switching devices in a manner to devide the said other set of spindles into two separate sets of spindles.

4. A machine for manufacturing a tape containing a plurality of parallel electric wires and having therein eyelets at predetermined intervals, comprising a set of bobbin-carrying spindles for each of the said electric wires for forming tubular coverings therearound, a plurality of continuous paths for each set of spindles, another set of spindles operating in conjunction with the aforesaid sets of spindles, a plurality of paths for said other set of spindles, switching devices for the plurality of paths of said other set of spindles, means for operating said switching devices at predetermined intervals, said plurality of paths for said other spindles being constructed in a manner to form alternately a single tape and a pair of tapes interengaging with said tubular coverings, cones along the axis of which, the wires to be covered are adapted to pass, and on the outer surface of which, are adapted to be guided the threads for forming the coverings of said wires, and a jacquard arrangement to actuate said switching devices in a manner to divide the said other set of spindles into two separate sets of spindles, each of which comprises half of the total number of spindles making up the said other set of spindles.

In testimony whereof I hereunto affix my signature in the presence of two witnesses.

ANTONIO DE CAPITANI.

Witnesses:
 B. CARLO FULVOTTI,
 LYLE ROBB.